United States Patent Office 2,727,918
Patented Dec. 20, 1955

2,727,918

PREPARATION OF TITANIUM POLYMERS

Thomas Boyd, Springfield, Mass., assignor to Monsanto Chemical Company, St. Louis, Mo., a corporation of Delaware No Drawing. Application January 21, 1953,
Serial No. 332,530

16 Claims. (Cl. 260—429)

This invention relates to organic derivatives of ortho-titanic acid and to a process for preparing them. More particularly, this invention relates to a process for preparing polymers from organo mono- and dichloro titanates.

Monomeric organic mono- and dichloro titanates are well known compounds that hydrolyze readily in the presence of water and quickly break down to form titanium dioxide.

An object of the present invention is the provision of a process for the preparation of polymers from mono- and dichloro titanates.

Another object is the provision of a process for preparing organic solvent-soluble polymers from organic mono- and dichloro titanates.

A further object is the provision of a process for suppressing the formation of titanium dioxide during the polymerization of mono- and dichloro titanates.

These and other objects are attained by reacting mono- or dichloro titanates or mixtures thereof with restricted amounts of water in the presence of ammonia or an amine under conditions such that substantially no titanium dioxide is formed.

The following examples are given in illustration and are not intended as limitations on the scope of this invention. Where parts are mentioned, they are parts by weight.

Example I

Dissolve 1.0 mol of dichlorodibutoxy titanium in 10 mols of anhydrous toluene. Prepare a separate solution of 0.9 mol of water in 4 mols of otherwise anhydrous butanol. While maintaining the temperature of the dichlorodibutoxy titanium solution below 10° C. and while bubbling anhydrous ammonia through the solution, add the water-butanol mixture dropwise with constant and vigorous agitation. The ammonia should be added at a rate such that the solution is maintained neutral to litmus paper. After all of the butanol-water mixture has been added, continue agitation for another hour with continued addition of ammonia while keeping the solution neutral. At the end of this time, permit the solution to warm to room temperature and filter off the precipitate of ammonium chloride formed during the reaction. Distill a portion of the filtrate under vacuum to remove the solvent. The product is a straw colored liquid polymer that cannot be distilled without decomposition. Apply a thin film of the filtrate to a glass plate, evaporate the solvent and expose the plate to an atmosphere containing approximately 30% moisture. A continuous adherent film is formed.

Example II

To a solution prepared by dissolving 1.0 mol of dichlorodiethoxy titanium to 10 mols of anhydrous butanol, add 2.0 mols of diethyl amine. To this solution, add, by dropwise addition with constant and vigorous agitation, a mixture of 0.5 mol of water dissolved in 3.0 mols of otherwise substantially anhydrous butanol while maintaining the temperature of the solution below 10° C. After the water-butanol mixture has been added, continue the agitation for an additional hour and then permit the solution to warm to room temperature. Filter the solution to remove the diethyl amine hydrochloride and recover the product from the filtrate by vacuum distillation. The product is a low molecular weight liquid polymer that decomposes before its boiling point is reached.

Example III

Dissolve 0.5 mol of dichlorodibutoxy titanium and 0.5 mol of monochlorotributoxy titanium in 10 mols of anhydrous xylene. Prepare, separately, a mixture of 0.8 mol of water in 4.0 mols of otherwise substantially anhydrous butanol. While maintaining the temperature of the solution at approximately 5° C. and, while bubbling anhydrous ammonia through the solution, add the water-butanol mixture dropwise with constant and vigorous agitation. The ammonia is added at a rate such that the solution is maintained neutral to litmus paper. Continue the agitation for about one hour after all of the water-butanol mixture has been added with continued addition of ammonia while maintaining the solution neutral to litmus paper. Allow the solution to warm to room temperature and filter. The product is recovered by vacuum distillation of the filtrate. It is a liquid copolymer that decomposes before its boiling point is reached.

Example IV

Prepare a solution by dissolving 1.0 mol of dichlorodistearyloxy titanium and 3.0 mols of aniline in 10 mols of anhydrous xylene. While maintaining this solution at a temperature of less than 10° C., add a mixture of 1.5 mols of water and 6.0 mols of otherwise anhydrous butanol. The addition should be made slowly and accompanied by constant agitation. Near the end of the reaction, extreme care must be used in the addition of the water-butanol mixture to prevent the precipitation of colloidal titanium dioxide. Filter the solution and recover the product by vacuum distillation. The product is a polymeric amorphous solid that does not have a definite melting point.

The polymers of this invention are prepared by the controlled addition of limited amounts of water to monomeric organic mono- or dichloro titanates. The ratio of water to monomer may be varied from 0.5:1 to 1.5:1 on a molar basis. Outside of this range, the polymeric products of the present invention are not produced. Extreme care must be used in the addition of the water to the monomer since too rapid addition in localized areas will produce titanium dioxide.

In order to prepare the polymers of the present invention, the monomer should be dissolved in an anhydrous organic solvent. The water should be added to this solution very slowly, this being conveniently accomplished by mixing the water with an otherwise anhydrous organic solvent which is compatible with the solvent for the monomer. Anhydrous ammonia or an anhydrous amine should be present during the addition of the water-solvent mixture.

The monomer may be dissolved in any anhydrous organic medium in which it is soluble. Conveniently, many of the monomers are prepared in an organic solvent such as butanol and need not be recovered therefrom before the addition of the water although it is usually necessary to add additional solvent in this case. The amount of solvent should be at least 3.0 and preferably about 10 mols per mol of monomer. Since the monomers are soluble in a large variety of organic liquids, solvents such as alcohols, ethers, hydrocarbons, chlorinated hydrocarbons, etc. may be used. The monomers are particularly soluble in benzene and homologues thereof such as toluene and, accordingly, the use of solvents of this nature is preferred. Mixtures of two or more solvents may be used if desired.

The water should be mixed with an otherwise anhydrous organic liquid with which it is miscible to the extent of at least 5% by weight, it also being necessary that the liquid be miscible with the solvent for the monomer. The water may be mixed with two or more such liquids if desired. Not more than about 5% by weight of water should be present in the organic medium and for some liquids, such as ethanol, even 5% by weight is too much unless the dilution of the monomer in the organic solvent is greater than 1.0 mol in 10 mols of solvent. The limit of the concentration of water for each solvent may be easily determined by adding a drop of the water-containing liquid to the monomer solution. If a white precipitate appears, the concentration of the water in the solvent is too great.

The addition of the water-solvent mixture should be accompanied by vigorous agitation and should be accomplished quite slowly even when appropriate dilutions of the monomer and water are used. The agitation should be sufficient to disperse the water substantially instantaneously through the monomer solution. The rate of addition of the water must be slow enough to prevent the formation of titanium dioxide. Advantageously, this is carried out by adding the organic solvent containing the required amount of water in small droplets to the monomer solution.

Anhydrous ammonia or an amine should be present during the addition of the water. Any suitable primary, secondary or tertiary amine which is soluble in the organic solvent for the monomer may be used. If desired, mixtures of two or more amines may be used. At least 1.0 mol of amine per mol of combined chlorine should be used but it is preferable that a substantial excess be used.

The reaction may be carried out at any temperature between the freezing point and the boiling point of the monomer solution but it is preferable that temperatures of less than 10° C. be used as the reaction is more easily controlled and goes more smoothly at such temperatures.

The organic mono- and dichloro titanates which may be polymerized in accordance with the present invention have the general formula $TiCl_n(OR)_{4-n}$ wherein $n$ is an integer no greater than 2 and wherein R is an organic radical which may be alkyl, aryl, aralkyl, alkenyl or aralkenyl. The dichloro titanates are conveniently prepared by refluxing a concentrated solution of titanium tetrachloride dissolved in an anhydrous alcohol or phenol. The monochloro titanates are conveniently prepared by reacting a tetraorgano ester of orthotitanic acid with acetyl chloride. This process is more fully described in an article by J. Jennings et al. in the "Journal of the Chemical Society" (1936, pages 637–640). A convenient method for obtaining the tetraorgano esters that are used when the monochloro titanates are to be prepared is described in applicant's Patent No. 2,579,414 dated December 18, 1951, disclosing a process by which titanium disulphide is reacted with an alcohol or phenol in order to obtain tetraorgano derivatives. Suitable alcohols and phenols from which the organic radicals of the monomers of the present invention may be derived in accordance with the above methods include mono- and polyhydric alcohols and mono- and polyhydroxy benzenes, and substituted alcohols and phenols such as amino, nitro, halogeno, etc. alcohols and phenols. Examples of the alcohols and phenols which may be used are methanol, ethanol, propanol, isopropanol, butanol, isobutanol, tertiary butyl alcohol, amyl alcohols, octyl alcohols, cetyl alcohol, lauryl alcohol, stearyl alcohol, oleyl alcohol, allyl alcohol, methallyl alcohol, benzyl alcohol, halogeno alcohols such as chlorethanol, brombutanol, etc., polyhydric alcohols such as glycols, glycol ethers such as diethylene glycol, glycerol, sorbitol, mannitol, etc., phenol, p-chlorophenol, m-nitrophenol, aminophenols, cresols, xylenols, resorcinol, catechol, phloroglucinol, phenethyl phenol, etc. The monomers may be polymerized alone or mixtures of two or more monomers may be copolymerized.

The polymers and copolymers of this invention are not to be confused with polymers and copolymers obtained by vinylic polymerization, i. e., polymerization dependent only upon unsaturated vinylidene or allyl groups. The vinylic polymers and copolymers have chemical and physical properties which are entirely different from the properties of the polymers of this invention.

The polymers prepared in accordance with the present invention range from liquids to hard solids depending on the character of the particular monomer and the amount of water used. They are soluble in most common organic solvents such as aromatic and aliphatic hydrocarbons, alcohols, ketones, chlorinated hydrocarbons, etc. In general, the polymers prepared by reacting less than 1.0 mol of water with each mol of monomer are further reactable with water to form polymeric products similar to those prepared by initially reacting more than 1.0 mol of water with each mol of monomer.

The polymers of the present invention may be used as modifiers for condensation resins such as phenol-, urea-, and melaminealdehyde resins. They tend to speed up the cure of such resins and to produce a tougher product especially when used in film-forming compositions. The polymers initially prepared by the reaction of one mol or less of water with each mol of monomer are particularly useful for treating textile fabrics in order to render them water-repellent. Such fabrics are rendered water-repellent by being impregnated with the partially condensed polymers after which the polymers are further condensed with water to form water-insensitive products. Water-repellency is not destroyed by dry cleaning and laundering operations.

It is obvious that many variations may be made in the process and products of the present invention without departing from the spirit and scope thereof as defined by the appended claims.

What is claimed is:

1. A process for preparing a polymeric titanate by reacting water with a monomeric titanate having the general formula $TiCl_n(OR)_{4-n}$ wherein $n$ is an integer of 1–2 inclusive and wherein R is an organic radical taken from the group consisting of alkyl, aryl, aralkyl, alkenyl, and aralkenyl radicals which comprises preparing a solution of said monomer in at least 3 mols of an anhydrous organic solvent per mol of monomer, separately preparing a mixture of water with an organic solvent miscible with at least 5% by weight of water and miscible with said first-named solvent, said mixture containing not more than about 5% by weight of water, and slowly adding said mixture to said solution with vigorous agitation in the presence of at least 1 mol per mol of combined chlorine in the monomer of a compound taken from the group consisting of anhydrous ammonia and anhydrous primary and secondary amines soluble in said first-named solvent, from 0.5–1.5 mols of water per mol of monomer being added to said monomer solution, said monomer and said water being diluted in their said respective solvents to an extent sufficient to substantially preclude the evolution of titanium dioxide during said addition.

2. A process in accordance with claim 1 wherein the compound is anhydrous ammonia.

3. A process in accordance with claim 1 wherein the compound is diethyl amine.

4. A process in accordance with claim 1 wherein the compound is aniline.

5. A process in accordance with claim 1 wherein the reaction is conducted at a temperature of less than 10° C.

6. A process in accordance with claim 1 wherein the monomer is a dichlorodialkoxy titanium monomer.

7. A process in accordance with claim 1 wherein the monomer is a dichlorodiaryloxy titanium monomer.

8. A process in accordance with claim 1 wherein the monomer is a monochlorotrialkoxy titanium monomer.

9. A process in accordance with claim 1 wherein a plurality of monomers are copolymerized.

10. A process in accordance with claim 1 wherein a mono chlorotrialkoxy titanium monomer is copolymerized with a dichlorodialkoxy titanium monomer.

11. A process for preparing polymers and copolymers of monomers taken from the group consisting of dichlorodialkoxy titanium and monochlorotrialkoxy titanium monomers which comprises preparing a solution of monomer in at least 3 mols of an anhydrous organic solvent per mol of monomer, separately preparing a mixture of water with an organic solvent miscible with at least 5% by weight of water and miscible with said first-named solvent, said mixture containing not more than about 5% by weight of water and, while said solution is maintained at a temperature of less than 10° C., slowly adding said mixture thereto with vigorous agitation in the presence of at least 1 mol per mol of combined chlorine in the monomer of a compound taken from the group consisting of anhydrous ammonia and anhydrous primary and secondary amines, from 0.5–1.5 mols of water per mol of monomer being added to said monomer solution, said monomer and said water being diluted in their said respective solvents to an extent sufficient to substantially preclude the evolution of titanium dioxide during said addition.

12. A process as in claim 11 wherein the monomer is dichlorodiethoxy titanium.

13. A process as in claim 11 wherein the monomer is dichlorodibutoxy titanium.

14. A process as in claim 11 wherein the monomer is dichlorodistearyloxy titanium.

15. A process as in claim 11 wherein the monomer is monochlorotributoxy titanium.

16. A process as in claim 11 wherein monochlorotributoxy titanium is copolymerized with dichlorodibutoxy titanium.

References Cited in the file of this patent

UNITED STATES PATENTS

| | | |
|---|---|---|
| 2,547,944 | Iller | Apr. 10, 1951 |
| 2,566,363 | Pedlow | Sept. 4, 1951 |

OTHER REFERENCES

Jennings et al.: J. Chem. Soc., London, pages 637–640.

Seidell: Solubilities of Organic Compounds, 3rd ed., vol. 2, Van Nostrand, 1941, pages 542–543.